United States Patent Office 2,872,434
Patented Feb. 3, 1959

2,872,434

BETA-ACETOXYETHYL SILOXANES

Garrett H. Barnes, Jr., Pittsburgh, Pa., assignor to Dow Corning Corporation, Midland, Mich., a corporation of Michigan No Drawing. Application August 1, 1956
Serial No. 601,366

4 Claims. (Cl. 260—46.5)

The following invention relates to polymeric organosiloxanes containing units of the formula $$(ROCH_2CH_2)R'_nSiO_{\frac{3-n}{2}}$$

where R is selected from the group consisting of hydrogen atoms and acetyl radicals, R' is a monovalent hydrocarbon radical free of aliphatic unsaturation, and $n$ is an integer of from 0 to 2 inclusive.

It has been thought that organosilicon compounds which contain an oxygenated carbon atom beta to silicon in a carbon chain are generally unstable. The great sensitivity toward hydrolytic agents of the grouping Si—C—C—O, in which the last two atoms may be singly or doubly bound in alcohols, ketones, acids, esters, and the like, was found in numerous $R'_3SiC$—C—O type compounds and has been considered as typical of organosilicon compounds. This sensitivity was exemplified by cleavage between the alpha carbon and silicon, and the resultant production of $R'_3SiOSiR'_3$ type compounds. See JACS 69, 1551 (1947).

Theories in regard to the unstable nature of organosilicon compounds containing an oxygenated beta carbon atom seemed to be substantiated by the failure of various methods in attempts to prepare compounds such as those of the present invention. For example, it is shown in the copending application of John L. Speier, Serial No. 463,061, now abandoned, filed October 18, 1954, and assigned to the assignee of this invention, that unsaturated esters can be reacted with hydrogenosilanes such as $HSiCl_3$, or $CH_3SiHCl_2$ in the presence of organic peroxide or perbenzoate catalysts to produce the corresponding R'COOZSi≡ compounds, where Z is a saturated divalent aliphatic radical and R' is an alkyl radical. These silanes were then hydrolyzed to produce the corresponding siloxanes. In the silanes, however, the divalent Z radical had to contain at least three carbon atoms. In other words, the reaction of allyl acetate with e. g. $HSiCl_3$ produced the compound of $Cl_3SiCH_2CH_2CH_2OOCCH_3$, but the comparable attempt to react vinyl acetate was unsuccessful in producing the corresponding ethylenic derivative. It is also known from U. S. Patent 2,550,205 that acetoxymethyl substituted organosilicon compounds can be prepared by reacting a chloromethyl substituted siloxane with a metal salt of a carboxylic acid. Such a reaction is exemplified by the general equation:

$$\equiv SiCH_2Cl + KOOCCH_3 \rightarrow \equiv SiCH_2OOCCH_3$$

This reaction is also unsatisfactory, however, when applied to a chloroethyl substituted organosilicon compound in attempting the preparation of the compounds of this invention.

In accordance with the present invention it has been found that not only is it possible to prepare β-hydroxyethyl and β-acetoxyethyl substituted siloxanes when the proper method is chosen, but that the alpha carbon atoms in these compounds is actually thermally and hydrolytically stable in spite of the earlier theories on the matter as discussed above. In other words, the instability of $R'_3SiC$—C—O type compounds does not appear in those compounds containing β-hydroxyethyl or β-acetoxyethyl radicals when there are less than three of the R' radicals.

The polymers of this invention are produced by hydrolyzing organosilanes of the formula $$R'_nSiX_{3-n}(CH_2CH_2OOCCH_3)$$

where R' and $n$ are as above defined and X is a hydrolyzable substituent. The hydrolysis of this type of a monomeric silane under relatively mild conditions produces the corresponding siloxanes in which the acetoxy radical remains intact. If relatively drastic conditions are used in the hydrolysis, however, as for example the refluxing of the hydrolysis mixture in the presence of dilute aqueous alkali, the acetoxy radical can be hydrolyzed as well as the silicon bonded X atoms, thus producing the corresponding β-hydroxyethyl siloxanes. The hydroxy substituted compounds can also be prepared by hydrolyzing the above defined silane and then treating the acetoxyethyl substituted product with an alcohol and an acid catalyst, or an alcohol and an alkaline catalyst such as NaOH or KOH followed by neutralization of the resultant salt.

In the silanes which are employed to yield the products of this invention upon hydrolysis, the X radicals can be any hydrolyzable silicon bonded substituents, e. g., halogen atoms such as Cl and Br, alkoxy radicals such as methoxy, ethoxy and isopropoxy or any of the other well-known silicon bonded hydrolyzable substituents which are readily prepared from the corresponding halosilanes. Since there is no particular need for employing silanes in which the X substituents are anything other than halogen atoms, and since the silanes in which X is chlorine or bromine are the most easily prepared of the defined silanes, it is preferred that said halosilanes be employed as the intermediate compounds from which the defined siloxanes are produced.

These preferred halosilanes can be prepared by reacting a hydrogenosilane of the general formula $$R'_nHSiY_{3-n}$$

where Y is Cl or Br, with vinyl acetate in the presence of chloroplatinic acid as a catalyst. This reaction is generally carried out in the range of 80 to 180° C., and preferably in the presence of at least $1 \times 10^{-6}$ mol of chloroplatinic acid per mol of the silane. The method of preparation of the necessary intermediate acetoxyethyl silanes is fully illustrated in the copending application of John L. Speier and Donald E. Hook, Serial No. 550,831, filed December 5, 1955, which also shows that similar silanes wherein X is alkoxy, etc. can be prepared by the corresponding reaction of appropriately substituted hydrogenosilanes.

As noted previously, R' can be any monovalent hydrocarbon radical free of aliphatic unsaturation. Illustrative examples of suitable radicals are alkyl radicals such as methyl, ethyl, propyl and octadecyl; aralkyl radicals such as benzyl; aromatic radicals such as phenyl, tolyl, xenyl and xylyl; and cycloaliphatic radicals such as cyclohexyl. The most preferred R' radicals are methyl and phenyl.

The polymers of this invention include not only those in which the defined acetoxyethyl or hydroxyethyl siloxane units are the only siloxane units present, but also those in which such units are part of a copolymer in which the remaining units are of the formula $$R''_mSiO_{\frac{4-m}{2}}$$

where R'' is selected from the group consisting of monovalent hydrocarbon radicals and halogenated monovalent hydrocarbon radicals and $m$ is an integer of from 0 to 3 inclusive. Preferably there is not more than 99 molar percent of the latter type of units present in the copolymer.

The above copolymers are best prepared by cohydrolyzing a mixture of the defined acetoxyethyl substituted silanes and hydrolyzable silanes of the formula $R''_m SiX_{4-m}$ where $R''$, X and $m$ are as above defined. Thus, for example, one or more silanes such as $Si(OC_2H_5)_4$, $CH_3SiCl_3$, $(CH_3)_2SiCl_2$, $CH_3C_6H_5SiCl_2$, $(CH_3)_3SiOC_2H_5$ and $(CH_3)_2C_6H_5SiCl$ can be mixed with the defined acetoxyethyl silanes and the mixture hydrolyzed to produce copolymers containing the corresponding $SiO_2$, $R''SiO_{1.5}$, $R''_3SiO_{.5}$ or $R''_2SiO$ units in any desired proportion. The $R''$ radicals can be any of the radicals set forth above as illustrative of the $R'$ radicals. The $R''$ radicals, however, are not necessarily free of aliphatic unsaturation and hence include alkenyl radicals such as vinyl, allyl and hexenyl as well as halogenated hydrocarbon radicals such as mono- or dichlorophenyl, mono- or dibromophenyl, tetrafluoroethyl, $\alpha,\alpha,\alpha$-trifluorotolyl, tetrabromoxenyl, chlorocyclohexyl, and chlorovinyl radicals. Of course, copolymers can also be obtained by cohydrolyzing a mixture of the defined acetoxyethyl silanes in which each silane contains a different $R'$ group attached to silicon, or in which only a portion of the silanes contain any $R'$ groups.

The nature of the hydrolyzate or cohydrolyzate will depend not only upon the overall degree of substitution of the polymer, i. e. the ratio of organic groups to Si atoms, but upon the nature of the organic groups which are present. Homopolymers prepared to the hydrolysis of the defined acetoxyethyl silanes can be either cyclic or linear in structure when $n$ has a value of 1. The linear polymers can be either hydroxyl endblocked or endblocked by other triorganosiloxy units when such are present. When siloxanes in which $n$ is 0 are present the products are ordinarily cross linked and resinous in nature. As is usual in organosiloxane polymers, traces of hydroxyl groups attached to some of the silicon atoms present are not uncommon. The soluble and fusible stage of any of the cross linked polymers of course contains a considerable portion of the endblocking hydroxyl groups which undergo condensation upon further curing of the polymer. Thus it can be seen that the polymers of this invention are similar to conventional organosiloxane polymers and copolymers in their structure except for the fact that they contain the acetoxyethyl or hydroxyethyl substituents.

Conventional organosilane hydrolysis or cohydrolysis techniques are applicable to the production of the polymers and copolymers of this invention. These techniques are amply described in the literature and need no detailed discussion. It must be noted here, however, that the hydrolysis must be conducted under relatively mild conditions when it is desired to retin the acetoxyethyl group and to avoid the formation of the corresponding hydroxyethyl substituents.

The polymers of this invention which are fluid in nature are useful as lubricants. Those which are resinous in nature can be used as coating compositions, impregnating resins and the like and have the properties of electrical insulation and thermal stability for which the organosiloxanes as a class have become famous. The presence of the functional acetoxyethyl or hydroxyethyl groups permits the use of these materials as intermediates in reactions which are typical of these organic substituents. Perhaps the major utility of the acetoxyethyl substituted materials lies in their use as intermediates in the production of the hydroxyethyl substituted materials. The latter in turn find their major utility in the preparation of resins by reactions which utilize the hydroxyethyl group, e. g. the reaction with various diisocyanates such as toluene diisocyanate. The resinous product obtained by the latter reaction can be employed in the treatment of textiles to render them water repellant.

The following examples are illustrative only. The symbols Me, Et, Ph, and Ac have been used to represent methyl, ethyl, phenyl and acetyl radicals respectively.

Example 1

Vinylacetate and $MeHSiCl_2$ were mixed in an equimolar ratio and heated at reflux temperature for 23 hours in the presence of chloroplatinic acid in an amount which provided $2 \times 10^{-5}$ mol of the acid per mol of silane. Distillation of the reaction product yielded the compound $MeCl_2SiCH_2CH_2OAc$, boiling at 118° C. at a pressure of 60 mm. Hg, $n_D^{25}$ 1.4390, $d_4^{25}$ 1.178. The hydrolysis of this silane yielded an oily polymer of the unit formula $(AcOCH_2CH_2)CH_3SiO$ having the following properties: $n_D^{25}$ 1.4500, $d_4^{25}$ 1.154 and $R_D$ 0.2327. The saponification equivalent of this oil showed that the acetoxy group was still present. When a solution of the hydrolyzate was prepared in an equal weight of benzene and the solution heated at reflux in the presence of a theoretical excess of ethanol, with HCl present as a catalyst, the corresponding hydroxyethyl substituted polymer having units of the formula $$(HOCH_2CH_2)CH_3SiO$$

was obtained.

Example 2

Vinylacetate and $HSiCl_3$ were reacted in the presence of chloroplatinic acid as in Example 1 to yield the product $Cl_3SiCH_2CH_2OAc$. This silane boiled at 117° C. at 70 mm. Hg, $n_D^{25}$ 1.4427. A solution of this silane in an equal weight of toluene was hydrolyzed with a two-fold excess of the theoretical amount of water and the hydrolyzate was washed free of acid to produce a toluene solution of a resinous product containing polymeric units of the formula $$AcOCH_2CH_2SiO_{1.5}$$

When this resinous solution is heated at reflux temperature with an excess of ethanol and a trace of KOH present as a catalyst, followed by neutralization with HCl, the corresponding hydroxyethyl substituted resinous product is obtained containing polymeric units of the formula $HOCH_2CH_2SiO_{1.5}$.

Example 3

The reaction of vinylacetate with $PhHSiCl_2$ in the presence of chloroplatinic acid in the manner of Example 1 produces the silane $PhCl_2SiCH_2CH_2OAc$, boiling at about 150° C. at 6 mm. Hg pressure, $n_D^{25}$ of about 1.508. When a mixture containing 25 molar percent of this silane, 25 molar percent $MeSiCl_3$, 10 molar percent $PhSiCl_3$, 10 molar percent $Me_3SiCl$ and 30 molar percent $PhMeSiCl_2$ is mixed with an equal weight of toluene and the mixture hydrolyzed with an excess of water, a resinous product is obtained containing the following siloxane units in the indicated molar proportions: $25(AcOCH_2CH_2)PhSiO$, $25MeSiO_{1.5}$, $10PhSiO_{1.5}$, $10Me_3SiO_{.5}$, $30PhMeSiO$. When a solution of this resin is heated with ethanol and HCl as in Example 1, the acetoxyethyl groups therein are converted to hydroxyethyl groups.

Example 4

When a mixture of 35 molar percent of the acetoxyethyl methyldichlorosilane of Example 1, 35 molar percent $Cl_2C_6H_3MeSiCl_2$ and 30 molar percent $Me_3SiCl$ is cohydrolyzed with an excess of water as in Example 1, a copolymeric fluid is obtained having the formula $$Me_3SiO[(AcOCH_2CH_2)MeSiO]_x[Cl_2C_6H_3MeSiO]_y SiMe_3$$

This fluid copolymer can be heated with an excess of ethanol in the presence of a catalytic amount of HCl to convert the acetoxyethyl radicals therein to hydroxyethyl radicals.

Example 5

When 1 mol of the (HOCH$_2$CH$_2$)MeSiO polymer of Example 1 is mixed with (Me$_2$SiO)$_4$ in an amount sufficient to provide 9 mols of the Me$_2$SiO units, and the mixture heated at 160° C. in the presence of sufficient powdered KOH to provide 1 K atom per 1,000 Si atoms, a rubbery copolymer is obtained containing both Me$_2$SiO and (HOCH$_2$CH$_2$)MeSiO units in the ratio of 9:1.

Example 6

The reaction of EtHSiCl$_2$ with vinyl acetate in the presence of chloroplatinic acid yields the silane $$EtCl_2SiCH_2CH_2OAc$$

The hydrolysis of this silane produces a polymer of (AcOCH$_2$CH$_2$)EtSiO units.

That which is claimed is:

1. A polymeric organosiloxane containing polymeric units of the formula (CH$_3$COOCH$_2$CH$_2$)R'SiO where R' is a monovalent hydrocarbon radical selected from the group consisting of methyl, ethyl and phenyl radicals.

2. A copolymeric organosiloxane in which from 1 to 99 molar percent of the polymeric units are of the formula (CH$_3$COOCH$_2$CH$_2$)R'SiO where R' is a monovalent hydrocarbon radical selected from the group consisting of methyl, ethyl and phenyl radicals, and the remaining polymeric units are of the formula $$R''_m SiO_{\frac{4-m}{2}}$$

where R'' is selected from the group consisting of monovalent hydrocarbon radicals and halogenated monovalent hydrocarbon radicals and $m$ is an integer of from 0 to 3 inclusive.

3. A copolymeric organosiloxane in which from 1 to 99 molar percent of the polymeric units are of the formula (CH$_3$COOCH$_2$CH$_2$)CH$_3$SiO and the remaining polymeric units are of the formula $$R''_m SiO_{\frac{4-m}{2}}$$

where R'' is selected from the group consisting of monovalent hydrocarbon radicals and halogenated monovalent hydrocarbon radicals and $m$ is an integer from 0 to 3 inclusive.

4. A polymeric organosiloxane containing polymeric units of the formula (CH$_3$COOCH$_2$CH$_2$)CH$_3$SiO.

References Cited in the file of this patent

UNITED STATES PATENTS

| | | |
|---|---|---|
| 2,443,898 | Ellingboe | June 22, 1948 |
| 2,527,591 | Speier | Oct. 31, 1950 |
| 2,550,205 | Speier | Apr. 24, 1951 |
| 2,574,390 | Hatcher | Nov. 6, 1951 |
| 2,582,569 | Speier | Jan. 15, 1952 |
| 2,770,633 | Sommer | Nov. 13, 1956 |

OTHER REFERENCES

Sommer et al.: J. A. C. S., vol. 68, page 1083 (1946).
Hauser et al.: J. A. C. S., 74, 5091–6, October 20, 1952.